United States Patent [19]
Jaeschke

[11] 4,446,392
[45] May 1, 1984

[54] ELECTROMAGNETIC COUPLING DEVICE
[75] Inventor: Ralph L. Jaeschke, Kenosha, Wis.
[73] Assignee: Eaton Corporation, Cleveland, Ohio
[21] Appl. No.: 377,896
[22] Filed: May 13, 1982
[51] Int. Cl.³ .......................................... H02K 49/02
[52] U.S. Cl. .................................... 310/105; 310/103; 310/263; 310/257
[58] Field of Search ................. 310/103, 105, 93, 263, 310/257, 142

[56] References Cited
U.S. PATENT DOCUMENTS

| | | | |
|---|---|---|---|
| 3,305,740 | 2/1967 | Shano | 310/263 X |
| 3,671,906 | 6/1972 | Hodges et al. | 310/263 X |
| 4,114,056 | 9/1978 | Nimura | 310/42 |

Primary Examiner—Donovan F. Duggan
Attorney, Agent, or Firm—C. H. Grace; M. L. Union

[57] ABSTRACT

An electromagnetic coupling device includes an input member, an output member rotatable relative to the input member, and a pole assembly associated with one of the input and output members. The pole assembly includes a pair of annular, oppositely disposed pole members and an annular core member disposed between the pole members and defining an annular cavity therebetween. An electrically energizable field coil element is disposed in said cavity for electromagnetically coupling said input and output members. The pole members each including a plurality of circumferentially spaced, radially extending pole slot means disposed for communicating the exterior of the pole assembly with the core member to provide substantially uninterrupted access thereto.

18 Claims, 4 Drawing Figures

ELECTROMAGNETIC COUPLING DEVICE

DESCRIPTION

1. Technical Field

The present invention relates to electromagnetic coupling devices, and more particularly relates to a new and improved pole assembly of the type for use with an electromagnetic coupling device which can be efficiently and economically fabricated to achieve good electromagnetic coupling characteristics yet at a relatively reduced cost.

2. Background Art

Heretofore, it has been well known to provide electromagnetic couplings of the type which include a rotor that is disposed within a rotatable inductor drum. A coil is energized to generate a magnetic flux field which electromagnetically couples the rotor and drum so that torque may be transmitted therebetween thereby to translate rotational force from an input member to an output member. Such devices have utilized "cookie" type pole assemblies which have noninterdigitated constructions that act to concentrate the flux field characteristics. Such types of "cookie" pole assemblies are disclosed, for example, in U.S. Pat. Nos. 3,742,270, 3,996,485 and 4,138,618 to Ralph L. Jaeschke.

In previous electromagnetic coupling devices, the construction of the pole assembly in some cases was of a multi-part fabricated construction with the various components being attached together by various mechanical fastener means such as by bolts, clamps or by welding. However, the use of such fastening means has been found to be disadvantageous due to the time and effort and hence, cost in assembling of the component parts particularly in those cases where accessibility was difficult, if not impossible, by reason of the relatively blind attachment locations. This is especially true in relation to interdigitated pole constructions wherein access to suitable fastening locations are extremely limited. With weldments, this problem is especially acute after the pole assembly has been installed within the housing of the coupling. This enhances the problems of repair and/or replacement of the component parts of the pole assembly. U.S. Pat. Nos. 2,287,953, 2,295,019 and 2,317,290 disclose typical prior fabricated type electromagnetic coupling devices.

It has also been known with such previous pole assemblies to make various of the component parts, such as the pole (cookie) members or the like, by casting or forging methods. However, certain problems obtain with either method. Castings, for example, have a lower density than rolled steel plate such that the magnetic efficiency of the system deteriorates in proportion to the reduction of density. Also, the tooling cost is substantial. That is, the patterns and the like for the casting process are costly. Forgings are also costly, though somewhat less than castings, primarily due to the high energy costs. In addition, forgings require considerable material which is often wasted during various steps in the forging operation. Still further, forging draft is excessive requiring considerably more machining operations. Further it is known that casting and forging methods involve considerable additional energy. Both methods use materials which were originally melted at the steel mill and remelted and/or reheated together with being annealed for maximum magnetic properties. These procedures all require considerable energy and hence, involve increased cost. In general, due to the high labor cost involved in typical casting and forging operations such methods for producing these types of pole assemblies are no longer desirable. Thus, it is desirable to provide a fabricated pole assembly which can be efficiently and economically produced while maintaining the desired electromagnetic coupling characteristics.

SUMMARY OF THE INVENTION

Accordingly, it is a provision of the present invention to provide a new and improved construction for a pole assembly of the type which can be utilized with an electromagnetic coupling device. More specifically, the present invention provides a construction which can be efficiently and economically fabricated essentially in the form of a three-piece structure for mounting an electrically energizable field coil element. The primary component parts of this structure being made from heavy steel plate which parts are arranged and constructed to enable facile weldability of the parts so as to provide a unitary pole assembly having good electromagnetic coupling characteristics. In the invention, the heavy steel plate materials are merely burnt out and then machined resulting in major cost savings as compared to prior casting and forging methods.

It is another provision of the present invention to provide such a new and improved electromagnetic coupling device as recited in the next preceding paragraph wherein the pole assembly can be quickly and easily fabricated with reduced time and effort and hence, cost; and which can be readily disassembled for repair and/or replacement thereof.

A further provision of the present invention is to provide a new and improved electromagnetic coupling device as recited in the next preceding paragraph wherein the pole assembly can be so produced without interferring with the electromagnetic coupling property characteristics thereof.

These and other provisions of the present invention are accomplished by an improved pole assembly for an electromagnetic coupling device of the type comprising an input member and an output member rotatable relative to the input member with the pole assembly operably associated with one of the input and output members. The pole assembly includes a pair of annular, oppositely disposed pole members with an annular core member disposed between the pole members and defining an annular cavity therebetween. An electrically energizable field coil element is disposed in the cavity for electromagnetically coupling the input and output members. The pole members each include a plurality of circumferentially spaced and radially extending pole slot means which communicate the core member with the exterior of the pole assembly so as to provide clearance areas adapted to directly receive weldments therein for affixedly attaching the core member in sandwiched relation between the pole members. The pole assembly is of an interdigitated construction with the pole members being made from a rolled steel material having magnetic properties and including radially extending flux concentrating projections. The pole slot means are symmetrically oriented between selective of said projections to provide optimum centrifugal balance of the coupling device with the pole slot means extending radially inwardly in a direction toward the rotational axis of the pole assembly a distance sufficient to define clearance areas communicating with the core member to accommodate the weldments. In a modified form, the pole slot means includes a configuration shaped to provide a guide function for a work tool adapted for removing the weldments for repair and/or replacement of the component parts, as desired.

DESCRIPTION OF THE PREFERRED EMBODIMENTS

Figure 1:
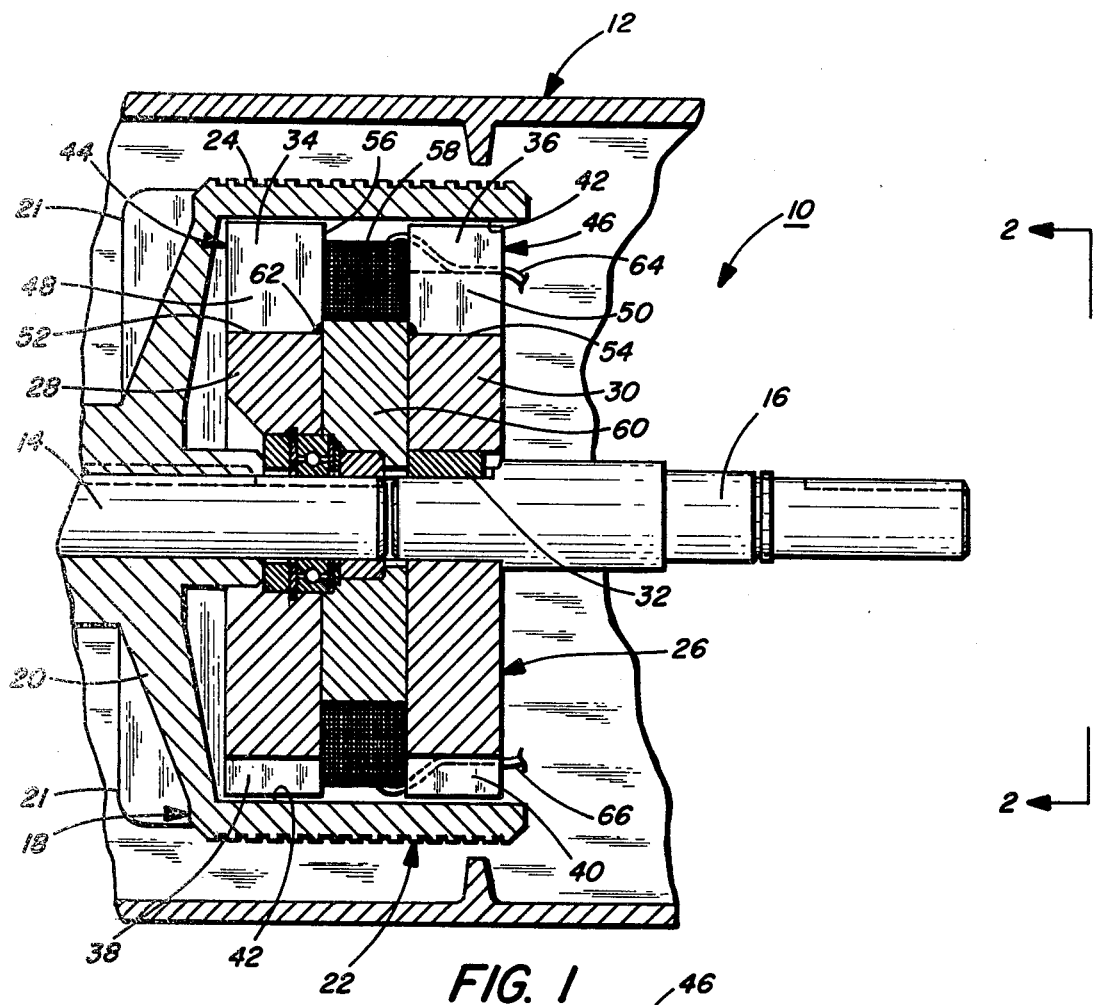
FIG. 1 is a fragmentary, axial half-section view of one form of an electromagnetic device in accordance with the invention.
Figure 2:
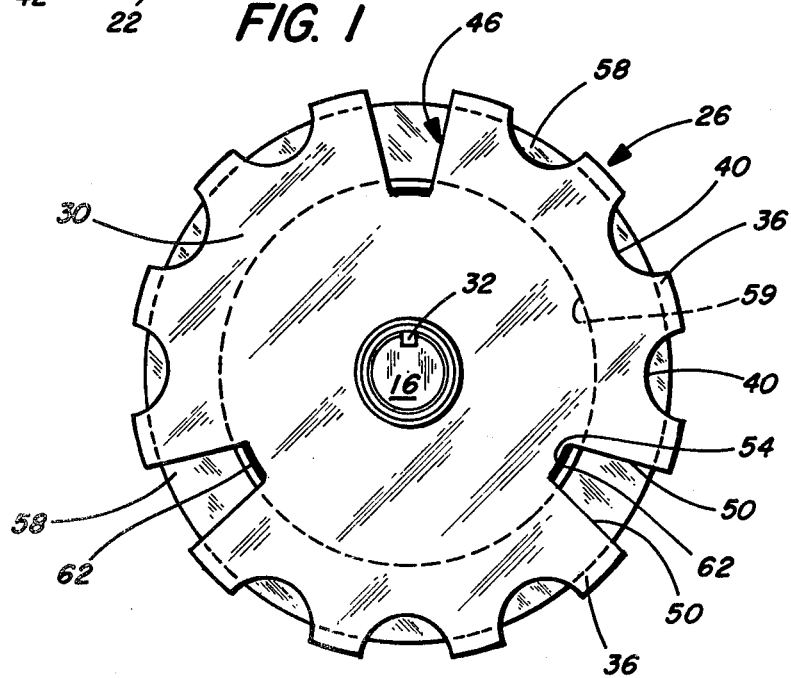
FIG. 2 is an end elevation view looking in the direction of the line 2—2 of FIG. 1 illustrating one form of the novel pole assembly removed from the housing for purpose of clarity.

Referring again to the drawings and in particular to FIGS. 1 and 2 thereof, there is illustrated one form of the electromagnetic coupling device, designated generally at 10, made in accordance with the present invention. As shown, the device 10 includes a housing 12 having an input member 14 and an output member 16 associated therewith. These input and output members comprise input and output shafts, respectively, which are axially aligned and rotatably supported for rotational movement relative to each other within the housing 12. This type of input and output arrangement is disclosed, for example, in U.S. Pat. No. 3,742,270 to Ralph L. Jaeschke. In such case, the input shaft 14 may be operably connected to a prime mover, such as a motor (not shown), as known in the art.

An inductor drum, as at 18, may be supported at one end on and disposed for rotation with the input shaft 14. The inductor drum 18 which, in the form shown, is illustrated as a single support type, may include a hub portion 20 having radial cooling fins 21 a cylindrical portion 22 which are fixed to the input shaft 14 for rotation therewith. The exterior of the cylindrical portion 20 may be provided with a plurality of circumferential fins, as at 24, which function to dissipate heat from the interior of the drum to the surrounding air or cooling medium which circulates around the inductor drum to prevent excess heating thereof, as known in the art. In the invention, it will be understood that though a single support inductor drum has been illustrated, other constructions may be employed such as double support inductor drums and the like.

Now in the invention, there is provided a non-interdigitated pole assembly, designated generally at 26, which is disposed for rotation within the housing 12. Preferably, the pole assembly 26 is of a three-piece construction comprised of a pair of annular, oppositely disposed magnetic pole members 28 and 30. The pole assembly 26 is fixed to the output shaft 16 with the pole member 30 being keyed, as at 32, to the output shaft 16 for rotation therewith. Preferably, the pole members 28 and 30 are made from hot rolled steel plate having good magnetic properties. The pole members 28 and 30 each include a plurality of individual, spaced apart non-interdigitated projections 34 and 36 which project in a radial direction away from the axis of rotation of the pole assembly 26. These projections 34 and 36 are burned out and defined by generally semi-circular recess portions 38 and 40 disposed alternately therebetween. The individual projections 34 and 36 are disposed around the periphery of the respective pole members 28 and 30 and concentric with the axis of rotation of the output shaft 16. The projections 34 and 36 are spaced from the cylindrical portion 22 of the inductor drum 18 by an air gap 42, as best illustrated in FIG. 1. The pole assembly having such non-interdigitated projections are generally known in the art as "cookie" type poles due to the cross-sectional configuration which is best illustrated in FIG. 2.

Now in the invention, the pole members 28 and 30 each comprise a plurality of circumferentially disposed pole spaces or slots 44 and 46 which extend radially outwardly from the rotational axis of the pole assembly 26. As shown, the pole slots are symmetrically oriented so as to be disposed between related sets of the projections 34 and 36 and between the correspondingly defined recess portions 38 and 40 so as to provide centrifugal balance. The pole slots 44 and 46, in the embodiment illustrated, are of an truncated triangular configuration having inclined side surfaces 48 and 50 which diverge upwardly and outwardly in a direction away from the rotational axis of the pole assembly. The bottom of the respective pole slots is defined by a generally planar seat surface 52 and 54 which are disposed substantially below the intermost extremities of the recess portions 38 and 40. In the invention, to magnetically accommodate for any loss in feed to the pole assembly by reason of material reduction from the pole slots, the pole members 28 and 30 may be slightly increased in cross-sectional dimension (width), as desired. By this construction and arrangement, the pole slots 44 and 46 effectively provide window-like openings to achieve ready access to the interior of the pole assembly so that the interior components can be "seen" for purposes of assembly, as will hereinafter be more fully described.

The pole members 28 and 30 together define a cavity, as at 56, therebetween which is of an annular configuration and adapted to receive a field coil element 58 therein. The field coil element 58 is supported in the cavity 56 by an annular core member 60 which is sandwiched between the pole members 28 and 30 and is secured thereto by means of weldments, as at 62, to provide a unitary construction for the pole assembly 26. As known in the art, the field coil element 58 is supported so that the pole assembly 26 may rotate within the housing 12 without interference from the coil element 58 or from the typical slip-ring assembly (not shown). A pair of leads 64 and 66 may be connected to the coil element 58 and provides for energization thereof by a suitable DC power source not illustrated.

Accordingly, by this arrangement the pole slots 44 and 46 formed (i.e. burned) in the associated pole members 28 and 30 provide access to the core member 60 to allow securement (welding) of the pole members to the core member. This enables the provision of a fabricated structure at a lower cost, as distinguished from a casting or forging the like at a higher cost. Specifically, it will be seen that the pole slots 44 and 46 have a depth sufficient to extend radially inwardly so that the generally planar bottom surfaces 52 and 54 are disposed below or inwardly of the confronting inner edge, as at 59, of the coil element 58 thereby to provide a clearance for securing (welding) the pole members 28 and 30 directly to the core member 60.

Further, it will be seen that since the pole assembly may be used with an electromagnetic coupling device having a slip-ring construction, the provision of the pole slots 44 and 46 provides improved accommodation for the leads 64 and 66 and hence, simplifies connection to the slip-ring assembly (not shown). In addition, it will be appreciated that balance weights or the like may also easily be incorporated in this area without effecting the magnetic conditions of the flux field. This is an advantage because balance weights normally installed at the bottom of the coil element space disturbs the magnetic efficiency of the device since they are close to the inductor drum.

Energization of the coil element 58 via the leads 64 and 66 effects establishment of a magnetic field having a flux path which runs through the components of the pole assembly for operatively connecting the input shaft 14 to the output shaft 16, in a manner as known in the art. In such case, the speed of the output shaft 16 will be dependent upon the speed of the input shaft 14 and the magnitude of the current flow through the coil element 58. Since there is some slip in such devices, the output shaft 16 will rotate at a lower speed than the inductor drum 18. The amount of slippage and, therefore, the speed of the output shaft 16 is controlled by the strength of the field produced by the coil element 58 which, in turn, is dependent upon the current supplied thereto. Accordingly, the output shaft speed 16 may be varied by varying the current to the coil element 58, as known in the art.

Figure 3:
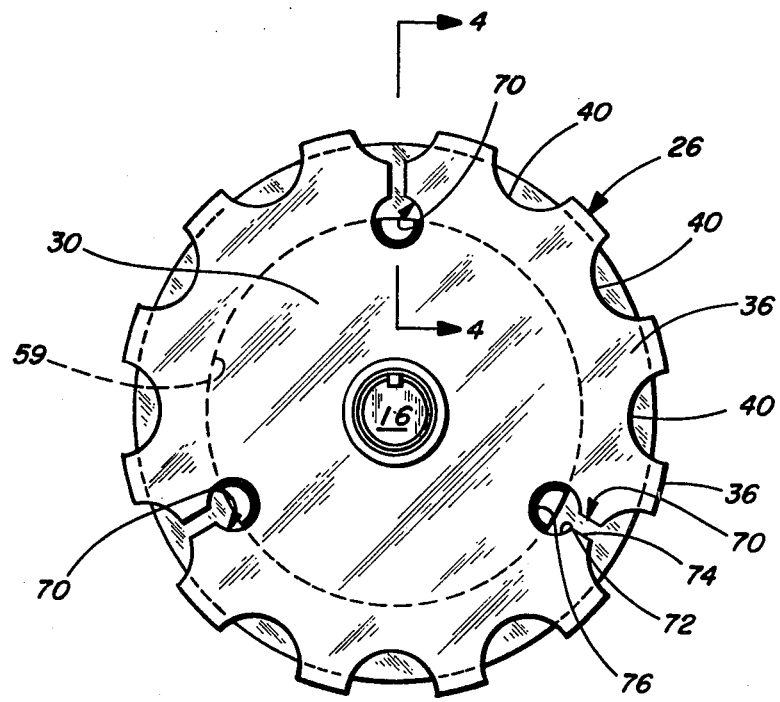
FIG. 3 is an end elevation view illustrating another modified form of the novel pole assembly in accordance with the present invention.
Figure 4:
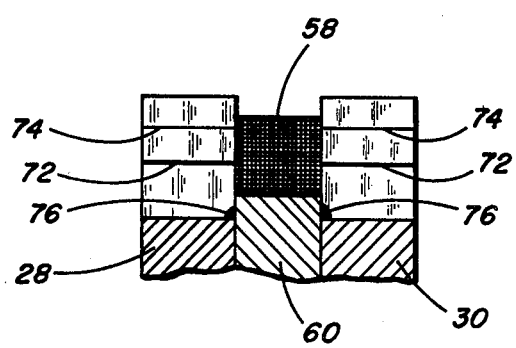
FIG. 4 is a fragmentary, vertical section view on an enlarged scale, taken along line 4—4 of FIG. 3.

In FIGS. 3 and 4 there is illustrated a modified form of the pole assembly 26 made in accordance with the invention. For purpose of clarity, like parts will hereinafter be identified by like reference numerals throughout. In this form, the pole members 28 and 30 include the radial projections 34 and 36 defined by the recess portions 38 and 40 but in this case with the pole slots for welding the pole members 28 and 30 to the core member 60 being of a modified configuration. In this form, the pole slots, designated generally at 70, are symmetrically oriented and are of a key-hole shaped configuration defined by circular openings, as at 72, which communicate with the associated recess portions 38 and 40 by means of radially extending passageways 74. Here again, the circular openings 72 are disposed so as to extend inwardly beyond the inner edge 59 (diameter) of the coil element 58 so as to expose the core member 60 to provide a clearance area for welding, as at 76, the associated pole members 28 and 30 thereto. Also, this construction has been found to reduce a major problem by preventing weld spatter from damaging the coil insulation. In this form, the circular opening 72 configuration also provides a guide for a drill bit of the like when it is desired to drill-out the weldment for purposes of taking the pole assembly apart for repair and/or replacement. In such case, the radial passageways 74 act as conduits for removal of drilled material from the cavity defined by the circular openings 72.

From the foregoing, it should be apparent that a new and improved electromagnetic coupling device has been provided which includes an input member, an output member rotatable relative to the input member, and an interdigitated pole assembly connected to the output member for rotation therewith. The pole assembly includes a three-piece construction which includes a core member that is sandwiched between a pair of annular pole members that are made from a rolled steel material having good magnetic properties and secured together into a unitary construction by weldments. The weldments are provided by means of a plurality of circumferentially spaced and symmetrically oriented pole slots located in the respective pole members providing direct access to the interior core member for purposes of welding or the like. In addition, such pole slots are of a configuration to function as guide means to accommodate suitable work tools (i.e. drills or the like) for ready removal of the weldments and hence, for disassembly of the component parts of the pole assembly. The construction provides a new and improved electromagnetic coupling device which is not only of a simple yet rugged construction but which can be built by low energy burning methods which afford reduced manufacturing costs.

I claim:

1. An electromagnetic coupling device comprising an input member and an output member rotatable relative to said input member, a pole assembly associated with one of said input and output members, said pole assembly including a pair of annular, oppositely disposed pole members, an annular core member disposed between said pole members and defining an annular cavity therebetween, an electrically energizable field coil element disposed in said cavity for electromagnetically coupling said input and output members, said pole members each including a plurality of circumferentially spaced, radially extending pole slot means disposed for communicating the exterior of said pole assembly with said core member to provide substantially uninterrupted access thereto, said pole slot means being symmetrically oriented and opening outwardly onto the periphery of associated pole members, said pole slot means having a radial depth sufficient to extend beyond the corresponding radial dimension of said field coil element so as to provide direct access from the exterior of said pole assembly to said core member, and wherein the radial innermost extremity of said slot means and the confronting exposed surface of said core member together define clearance areas adapted to receive therein securement means for affixedly attaching said core member in sandwiched relation between said pole members.

2. An electromagnetic coupling device as defined in claim 1, wherein said securement means comprises weldments.

3. An electromagnetic coupling device as defined in claim 2, wherein said pole members are made from a rolled steel material having magnetic property characteristics.

4. An electromagnetic coupling device as defined in claim 1, wherein said slot means is of a truncated triangular configuration, in side elevation, defined by side walls which extend upwardly and outwardly in a direction away from the rotational axis of said pole assembly.

5. An electromagnetic coupling device as defined in claim 4, wherein said side walls terminate radially inwardly in a generally planar bottom surface, and said bottom surface being spaced radially inwardly relative to the confronting interior edge surface of said field coil element sufficient to define a clearance area adapted to receive a securement means therein.

6. An electromagnetic coupling device as defined in claim 5, wherein said securement means comprises weldments.

7. An electromagnetic coupling device as defined in claim 6, wherein said pole members are comprised of a rolled steel material having magnetic property characteristics.

8. An electromagnetic coupling device as defined by claim 7, wherein said slot means is of a key-hole configuration, in side elevation, defined by a substantially circular opening portion and a radial passageway communicating said opening portion with the outer periphery of the associated of said core members.

9. An electromagnetic coupling device as defined by claim 8, wherein said opening portion has an innermost radius disposed radially inwardly of the innermost peripheral surface of said field coil element sufficient to define a clearance area adapted to receive a securement means therein.

10. An electromagnetic coupling device as defined by claim 8, wherein said securement means comprise weldments.

11. An electromagnetic coupling device as defined in claim 10, wherein said pole members are comprised of a rolled steel material having magnetic property characteristics.

12. An electromagnetic coupling device as defined in claim 8, wherein the circular portion of said key-hole configuration provides an axial guide adapted to receive a work tool for removing a securement means, such as a weldment, for disassembly of the pole members from said core member.

13. An electromagnetic coupling device as defined in claim 1, wherein said pole assembly is of an interdigitated construction connected to said output member for rotation therewith, and said field coil element is supported by said interdigitated pole assembly for rotation therewith.

14. An electromagnetic coupling device as defined in claim 13, wherein said pole members include radially extending non-interdigitated projections, said projections being defined by adjacent recess portions formed from the material of said pole members, and said slot means being circumferentially and symmetrically oriented relative to said projections so as to define selective sets of projections and recessed portions therebetween.

15. An electromagnetic coupling device as defined in claim 14, wherein said slot means having a greater radial depth as compared to said recess portions with said projections extending radially beyond the outermost periphery of said field coil element.

16. A pole assembly of the type for use with an electromagnetic coupling device, said pole assembly comprising a pair of laterally spaced and oppositely disposed annular pole members supported for rotation about a longitudinal axis, an annular core member having an annular outer peripheral surface disposed in sandwiched relation between said pole members, said annular outer peripheral surface of said core member being spaced apart from said longitudinal axis by a first radius, a field coil element disposed in supported relation about said annular outer peripheral surface of said core member between said pole members and adapted to be connected to a source of electrical energy, said pole members having a plurality of circumferentially spaced and radially extending pole slot means which extend toward said longitudinal axis and which are spaced from said longitudinal axis a distance which is less than the radius of said annular outer peripheral surface of said core member thereby providing for direct communication to said core member from the exterior of said pole assembly, and securement means insertable through said pole slot means for affixedly attaching said pole members to said core member.

17. A pole assembly defined in claim 16, wherein said pole slot means includes a radially directed slot having a depth greater than the corresponding radial dimension of said field coil element so as to define an exposed clearance area on said core member behind associated of said pole members, and said securement means being disposed in said clearance area for affixedly attaching said pole members to said core member.

18. A pole assembly as defined in claim 17, wherein said pole members are made from a rolled steel material having magnetic property characteristics.

* * * * *